US009659061B2

(12) United States Patent
Goetsch et al.

(10) Patent No.: US 9,659,061 B2
(45) Date of Patent: May 23, 2017

(54) METHOD FOR EFFICIENT AGGREGATION OF NUMEROUS DATA USING SPARSE BIT SETS

(71) Applicants: Adam K. Goetsch, Sammamish, WA (US); Nicholas W. West, Redmond, WA (US)

(72) Inventors: Adam K. Goetsch, Sammamish, WA (US); Nicholas W. West, Redmond, WA (US)

(73) Assignee: ServiceSource, San Francisco, CA (US)

( * ) Notice: Subject to any disclaimer, the term of this patent is extended or adjusted under 35 U.S.C. 154(b) by 513 days.

(21) Appl. No.: 13/894,353

(22) Filed: May 14, 2013

(65) Prior Publication Data

US 2014/0344298 A1  Nov. 20, 2014

(51) Int. Cl.
*G06F 7/00* (2006.01)
*G06F 17/00* (2006.01)
*G06F 17/30* (2006.01)

(52) U.S. Cl.
CPC .............................. *G06F 17/30501* (2013.01)

(58) Field of Classification Search
CPC ......... G06F 17/30501; G06F 17/30592; G06F 17/30088; G06F 17/30333; G06F 17/30336; G06F 17/30489; G06F 17/30949; G06F 17/30985; G06F 17/30548
See application file for complete search history.

(56) References Cited

U.S. PATENT DOCUMENTS

| | | | |
|---|---|---|---|
| 6,266,706 B1* | 7/2001 | Brodnik et al. | 709/242 |
| 2003/0195898 A1* | 10/2003 | Agarwal et al. | 707/103 R |
| 2004/0024729 A1* | 2/2004 | Worley | 707/1 |
| 2004/0210564 A1* | 10/2004 | Oksanen | 707/3 |
| 2004/0220972 A1* | 11/2004 | Bhattacharjee et al. | 707/200 |
| 2014/0122791 A1* | 5/2014 | Fingerhut et al. | 711/108 |

* cited by examiner

*Primary Examiner* — Susan Chen
(74) *Attorney, Agent, or Firm* — Mersenne Law

(57) ABSTRACT

A data-processing technique for increasing data-size capacity and improving query speed on large datasets where fields within records are replaced by integers representing distinct values of those fields, the integers drawn from a densely-populated range, wherein a computer data storage structure is initialized and maintained to represent a large number of binary values ("bits") within a smaller number of actual machine-memory bits of the computer. Representative structures and operations thereon, as well as applications of the data structure to support more-sophisticated data structures and operations, are described and claimed.

18 Claims, 8 Drawing Sheets

|     | Dictionary |                              |
| --- | ---        | ---                          |
| Key | Value      |                              |
| 0   | Value corresponding to key 0 |
| 1   | Value corresponding to key 1 |
| 17  | Value corresponding to key 17 |
| 38  | Value corresponding to key 38 |

*Fig.* 6

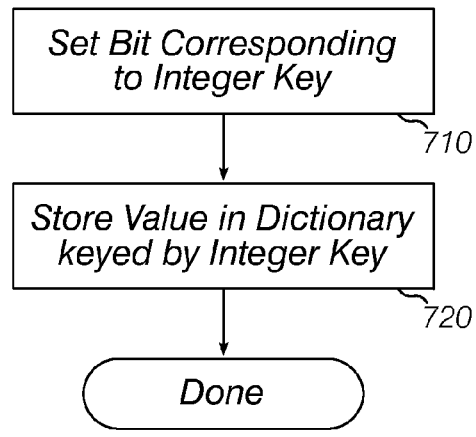
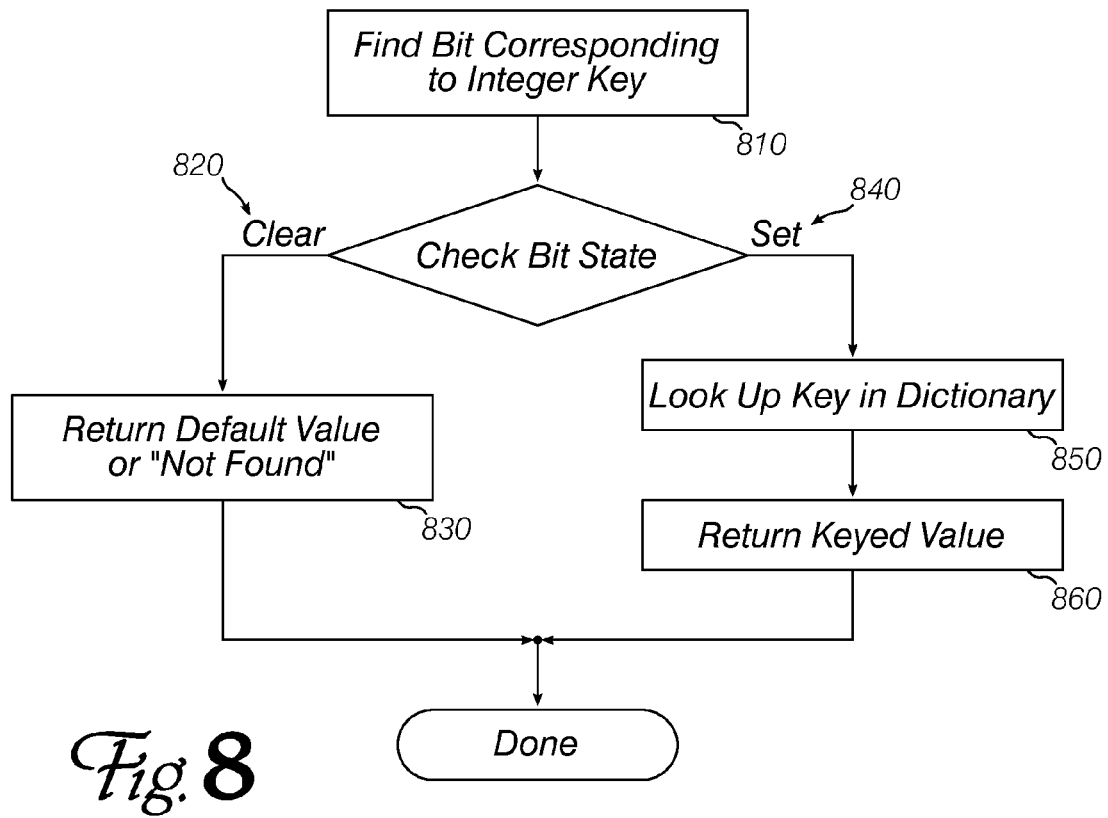

METHOD FOR EFFICIENT AGGREGATION OF NUMEROUS DATA USING SPARSE BIT SETS

CONTINUITY AND CLAIM OF PRIORITY

This is an original U.S. patent application.

FIELD

The invention relates to preparing data for information retrieval. More specifically, the invention relates to methods for transforming data structures and data objects with the purpose of facilitating further processing thereof.

BACKGROUND

The relentless advances in computing power and storage capacity whose underpinnings are recognized as conforming to Moore's Law ensures that ever more data (both kinds and quantities) are being collected and made available for analysis. Hardware and software improvements raise the practical limits on data set sizes that can be examined and manipulated, but there is still a large and growing gap between "big data" and "interactively explorable data." That is, while it is possible to execute queries and compute aggregate values over petabytes of data, the queries often take hours or even clays to run—one can obtain answers, but they are only useful if one knows the right questions before beginning. For exploring and investigating datasets—for learning the right questions to ask—faster query turnaround is essential.

Techniques for improving query performance on "medium-sized" datasets can increase the set sizes that can be explored interactively, reduce the hardware requirements for conducting data investigations, and/or answer more-complicated questions quickly. Such techniques may be of significant value in this field.

SUMMARY

Embodiments of the invention improve data processing operations such as queries (including queries joining tables) and computations of aggregate metrics by reducing raw memory requirements and increasing locality of access. Thus, the techniques permit faster query execution, and the queries can operate over larger data set sizes.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

FIG. 6 shows how an embodiment can be used to augment another data structure and improve its performance.

FIG. 7 outlines a first method performed with the augmented data structure of FIG. 6.

FIG. 8 outlines a second method performed with the augmented data structure of FIG. 6.

DETAILED DESCRIPTION

Figure 1:
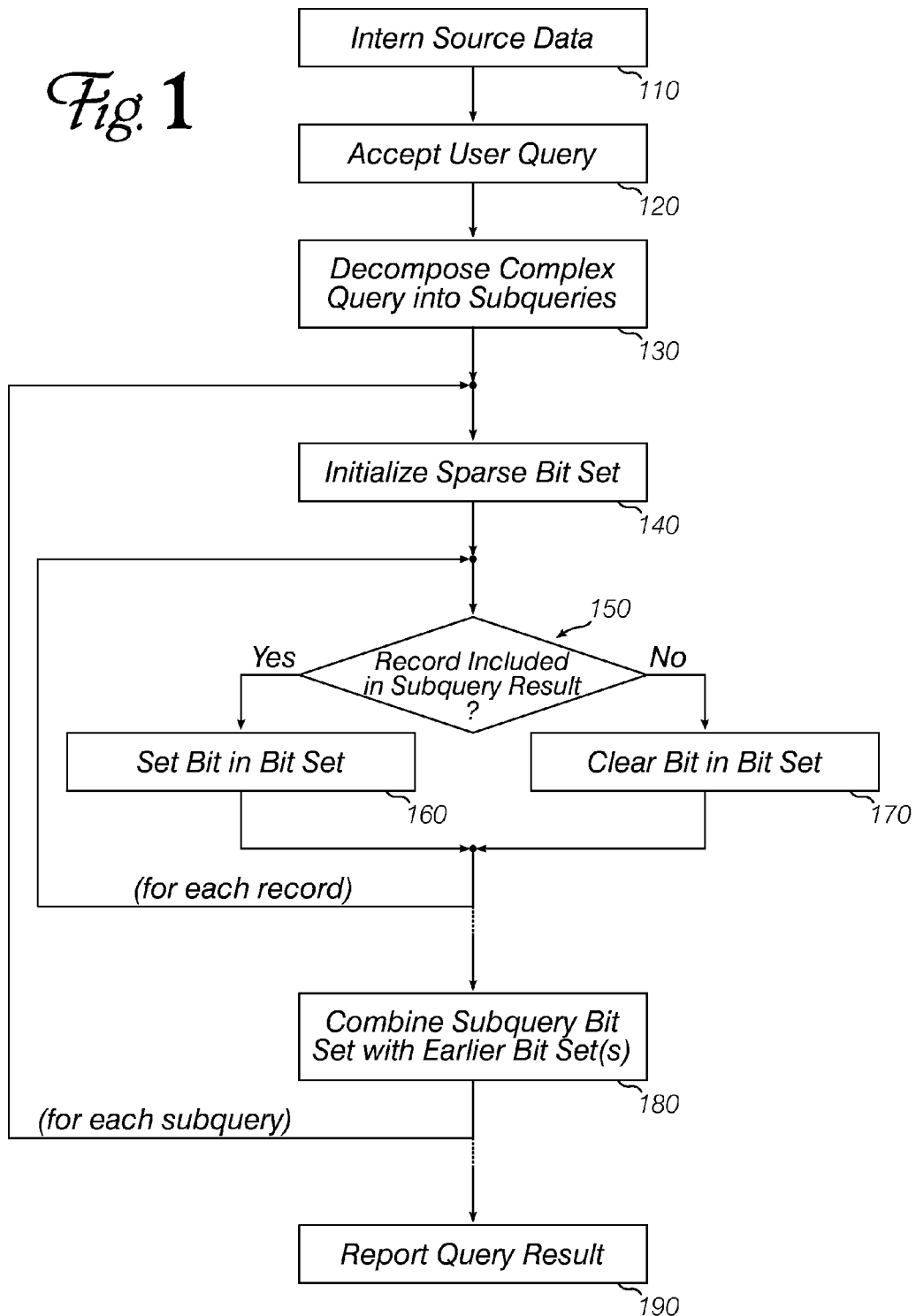
FIG. 1 shows an overview of process using an embodiment of the invention in executing a database query.

Embodiments of the invention form part of a suite of data management techniques that expand the envelope of data quantities and analyses that can be performed interactively. Real-time exploration of vast data sets is a powerful tool that can help managers of systems that collect data about their operations, identify, characterize and understand nuances of the systems. Improved understanding, in turn, can help inform changes to optimize the system.

In describing the operations and benefits of this invention, it is helpful to have a specific dataset in mind. The inventors have used embodiments to analyze data collected from Internet web services, so a simplified version of a web server log file will be used as an example here. Table 1 shows a few records from such a log file:

TABLE 1

| N | Timestamp | VisitorId | IPAddress | ArticleTitle |
|---|---|---|---|---|
| 1 | 2012-04-21 21:11:48.00 | 6791015 | 1.1.271.10 | Intellectual Diversity and Engineering Safety Margins |
| 2 | 2012-04-18 16:56:35.00 | 7228408 | 1.312.8.233 | G8 States Condemn NK Nuclear Moves |
| 3 | 2012-04-19 18:03:31.00 | 7810819 | 168.192.189.72 | G8 States Condemn NK Nuclear Moves |
| 4 | 2012-04-16 06:19:17.00 | 6947423 | 4.1.168.263 | G8 States Condemn NK Nuclear Moves |
| 5 | 2012-04-15 11:37:45.00 | 567524 | 1.740.234.39 | 50-year-old Mom looks 23! |
| 6 | 2012-04-15 16:14:45.00 | 7245320 | 108.132.259.187 | Miami judge accuses Apple and Samsung of using courts as 'business strategy' |
| 7 | 2012-04-18 11:56:33.00 | 7361691 | 17.138.182.27 | Symposium on Rehnquist's Fourth Amendment |
| 8 | 2012-04-16 19:53:11.00 | 7518724 | 2.100.201.150 | Intellectual Diversity and Engineering Safety Margins |
| 9 | 2012-04-19 04:32:48.00 | 2467978 | 109.11.332.54 | Shark Makes Off with Fisherman's Catch |
| 10 | 2012-04-16 07:40:22.00 | 6855973 | 109.200.221.5 | U.S. lawmakers in danger of becoming relevant |
| 11 | 2012-04-16 11:10:09.00 | 6038595 | 109.150.38.308 | Watch celebrity blooper reels reenacted by cats |
| 12 | 2012-04-18 15:40:42.00 | 6487469 | 109.255.248.65 | Shark Makes Off with Fisherman's Catch |
| 13 | 2012-04-19 08:51:19.00 | 7510984 | 109.113.220.106 | Miami judge accuses Apple and Samsung of using courts as 'business strategy' |
| 14 | 2012-04-17 15:54:21.00 | 6936315 | 109.113.220.106 | Currency and security issues in Upper Elbonia |

In the sample data file, each multi-field record memorializes a request from a client to retrieve a resource available from the server. N is an integer index of the record within the file; Timestamp is the date and time when the client requested the resource; VisitorId is an integer identifying the client; IPAddress is an Internet Protocol address of the client's computer; and ArticleTitle is the name of the requested resource. Other parts of the web server system attempt to ensure that VisitorIds are unique among clients, yet unchanging from request to request of any particular client. The records in a log file may be sorted by one of the fields (often the Timestamp field) but this is not essential. Unsorted or partially-sorted input data may be encountered if the embodiment processes data comprising concatenated log files from several different servers.

FIG. 1 is a flow chart outlining the central operations of an embodiment. First, the source data (a plurality of multi-field records of a common format) are read and interned (110). Interning is a process of assigning a unique integer to each distinct value of some or all fields of all the input records, as described in greater detail in co-pending U.S. patent application Ser. No. 13/791,281 by the same inventors. The disclosure of that application is incorporated by reference here.

Through interning, each record is converted into a set of field elements, some or all of which are actually integers representing a particular field value. The interned (representative) integers are chosen from densely-populated ranges, which for simplicity will be considered to run from 1 (one) to the number of distinct values encountered in the corresponding field of the input dataset. Interned ranges may have some unused or skipped values, and some administrative values (integers that represent concepts like "no data present in this field" or "illegal value") but the overwhelming majority of the integers will correspond to a distinct value of the field. Some interning processes will assign representative integers whose numeric order mirrors an order of the original data (such as a temporal order of timestamps, or an alphabetic order of article titles), while other interning may result in first-seen-first-assigned or essentially random ordering of representative integers. It is important to recognize that the range of integers for one field may be of a different size than the range of integers for another field—this corresponds to a different number of distinct values encountered in each field.

Next, a query about the data is received from a user (120). The query may be stated in any appropriate language, but for purposes of this explanation, the common SQL query language will be used. An example query that might be issued against the sample data set under consideration here is:

Listing 1

```
10  SELECT
20    VisitorID, COUNT(DISTINCT IPAddress), COUNT
      (DISTINCT ArticleTitle)
30  FROM
40    SampleDataset
50  WHERE
60    Timestamp > '11/07/2011 03:35:00 PM' AND
70    Timestamp < '12/07/2012 12:00:00 PM
80  GROUP BY
90    VisitorID
100 ORDER BY
110   COUNT(DISTINCT ArticleTitle) DESC
```

In English, this query calls for a report of the number of different IP addresses used by each visitor, and the number of different articles viewed by each visitor, during the 13-month period from November 2011 to December 2012, sorted so that the most active readers are displayed first. It is appreciated that, especially for very large datasets, aggregate functions such as COUNT and DISTINCT are expensive (they require significant memory, processing resources and/or time to compute). Embodiments of the invention allow such functions to be performed more cheaply.

A conventional query-planner may decompose a complex query like the example above into a set of simpler subqueries (130). Then, for each subquery, the system initializes a sparse bit set (140) sized to accommodate the result of the subquery, and processes the input data records (or a subset thereof) to divide them into two classes (included in the result, or excluded from the result) (150). For each record of one of the classes, a corresponding bit in the sparse bit set is set (160) or cleared (170).

Steps 150 and 160 or 170 are repeated for the other records in the dataset so that the sparse bit set identifies records that match the subquery. This bit set is combined with bit sets computed by other subqueries of the user's query (180) according to the query execution plan. Finally, the query result is reported to the user (190). For example, a requested aggregate quantity may be printed or plotted, or the records that satisfy the query conditions may be placed in a result set that can be subjected to further manipulations or queries.

Combining sparse bit sets can be clone pair-wise: two input sets can be joined to create a union; intersected to create a common subset; or exclusively-ORed to identify bits that are set in exactly one of the two sets. (Set inversion or negation, a single-operand function, rounds out the most useful operations on bit sets.) Another useful operation on a bit set is to count the number of set (or clear) bits.

It should be noted that the interning operation provides a rough count of the number of distinct values for each interned field, and this count is useful to set the size and/or number of bit sets that may be required to execute a query. For example, in the foregoing sample query, the maximum representative value interned for the VisitorID field gives the number of rows that the query will report, while the maximum representative value interned for the ArticleTitle field establishes the length (i.e., the number of bits) of a sparse bit set that can collect information for the DISTINCT (ArticleTitle) subquery, and the number of bits set in such a bit set answers the COUNT (DISTINCT ArticleTitle) portion of the query.

Logically speaking, a sparse bit set is simply an array of binary values, each element of which can indicate one of two states (zero or one, high or low, included or excluded, etc.) However, by representing the array as discussed here, a large number of bits can be managed in a much smaller amount of space—in general, a sparse bit set occupies fewer real (machine) bits than the number of bits in the bit set. (Conceptually, this is like data compression, where 1024 bits' worth of data might be represented with only 256 bits of storage.)

Since interning is particularly effective for read-only datasets, a preferred embodiment of the invention caches many of the sparse bit sets that are created while executing subqueries. Then, if the decomposition of another user query happens to include a previously-executed subquery, the subquery's result sparse bit set can be retrieved from the cache instead of being recomputed by scanning through the complete dataset. This caching can significantly improve performance, but since sparse bit sets are often much smaller than the total number of bits they represent, fewer machine resources—less memory—is required to answer queries.

Figure 2:
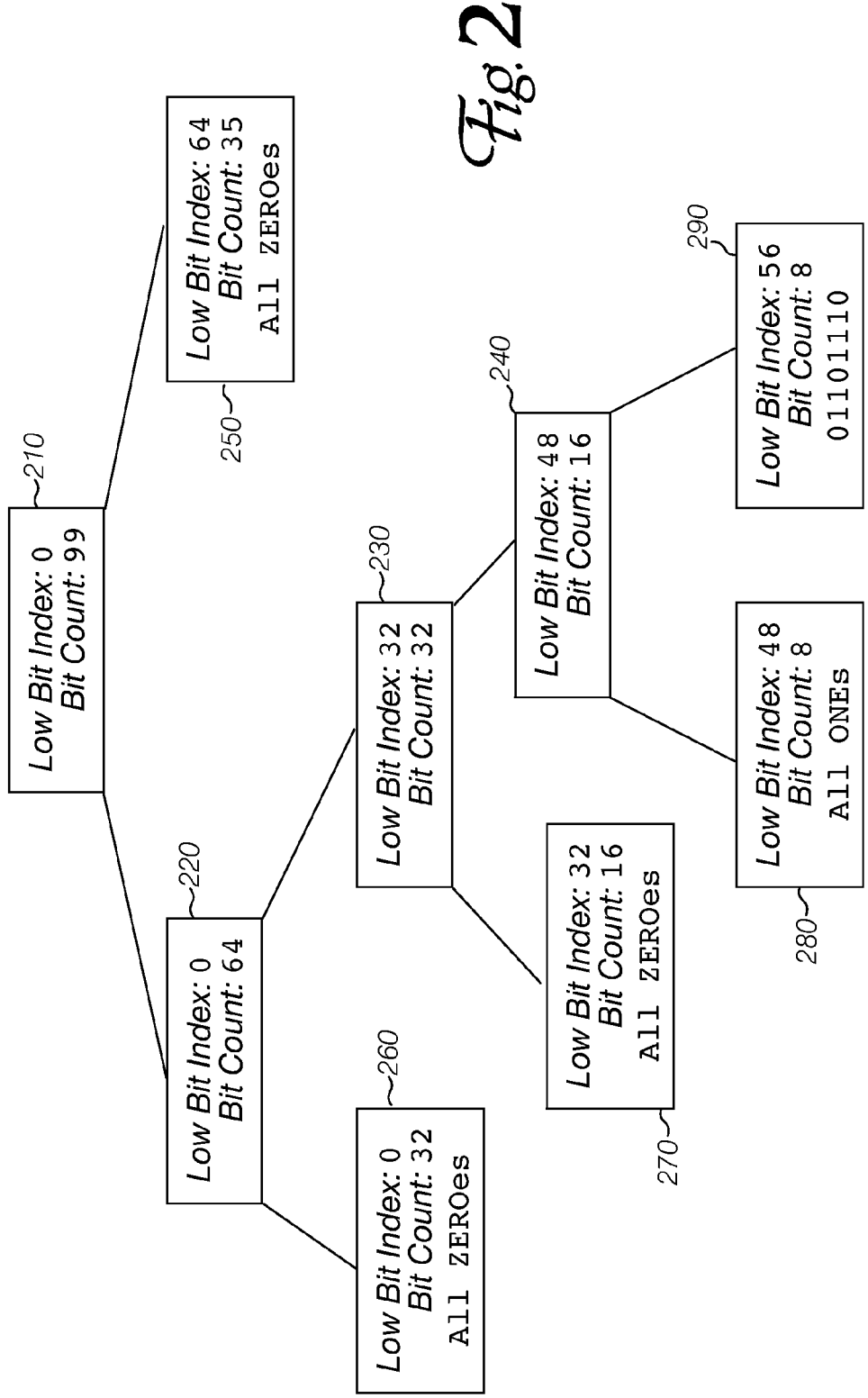
FIG. 2 shows a sample data structure that may be used by an embodiment.

Sparse bit sets may be represented by a hierarchical (tree) structure as shown in FIG. 2, the tree comprising a root 210, possibly one or more internal nodes 220, 230, 240, and one or more leaves 250-290. Each leaf represents one or more actual bits, which may be all zeroes (250, 260, 270), all ones (280), or an appropriately-sized array of bits containing a mixture of values (290). For efficient representation and manipulation by a standard programmable processor, leaf nodes should generally represent a power-of-two sized number of bits. (The exception to this rule is for the odd bits out of the last leaf, when the total number of bits is not a power of two. For example, since the tree of FIG. 2 represents 99 bits, leaf 250 represents only 35 bits.) Further, it is appreciated that most contemporary computers manipulate bits in groups of at least eight, and commonly in groups of 32, 64, or even 128 bits. These numbers are, of course, powers of two; but an efficient implementation would choose one of these natural word sizes as the basic leaf-node size, and manage its sparse bit structures as power-of-two multiples of the natural word size, rather than arbitrary powers of two.

Figure 3:
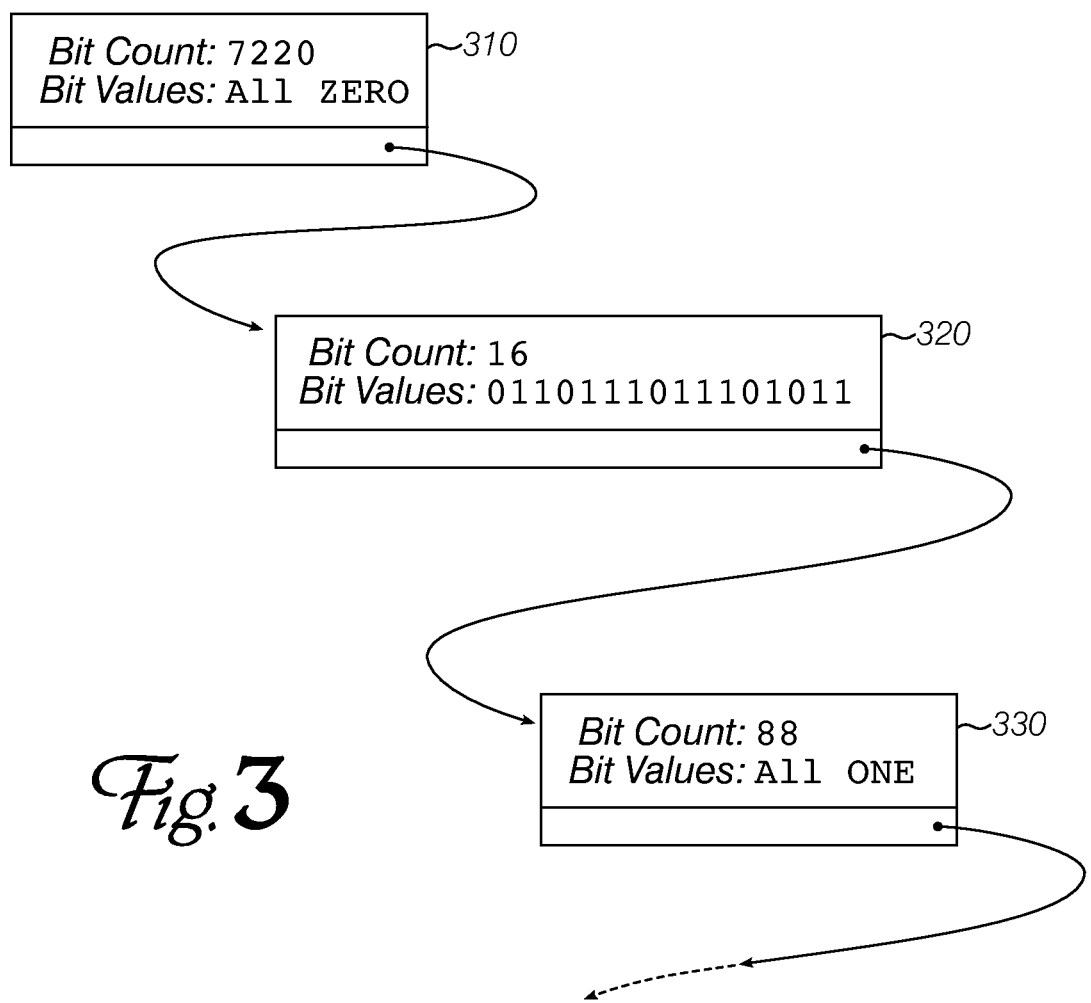
FIG. 3 shows a different data structure that may be used by an embodiment.

Another possible implementation of the sparse bit sets of an embodiment is the linked list shown in FIG. 3. Each node of the list comprises a bit count and information about the bits represented by the node. For example, node 310 represents a large number of zero bits, followed by a short, literal segment of bits whose values are directly represented (320), and then a run of all-one bits (330). Linked lists can be very space-efficient, but finding and setting or clearing bits can be slower than in other representations. In a linked list, there is less benefit to maintaining blocks as power-of-two multiples of the basic word size, but an implementation may favor such sizes anyway, so that conversions to and from the previously-described hierarchical tree format can be performed more efficiently.

Figure 4:
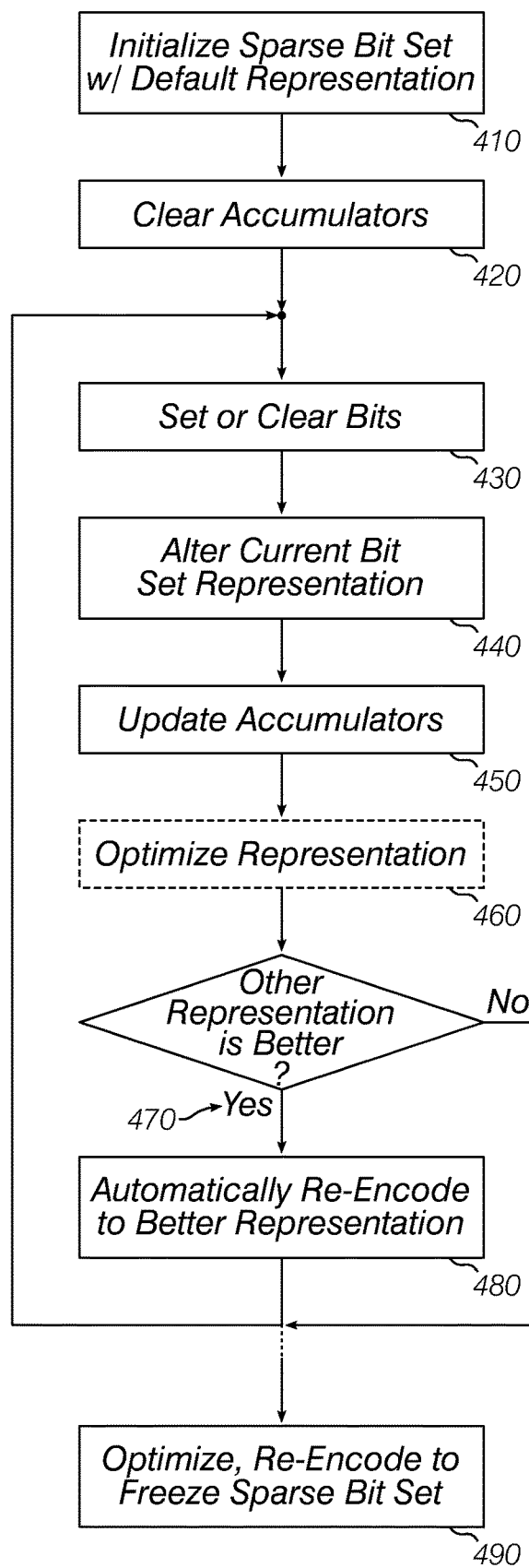
FIG. 4 explains how an embodiment may convert between different memory representations to achieve improved performance or reduced resource utilization.

In some embodiments, the instructions and data that are operable to manipulate and maintain a sparse bit set will collect statistical information about the set, such as the number of set bits or the average run length. A preferred embodiment may include automatic representation mutation as outlined in FIG. 4.

When a new sparse bit set is initialized (e.g., with a maximum size chosen based on the number of interned values its bits may be called on to represent), a default representation is chosen (410) and statistical information accumulators are cleared (420). Then, as bits are set or cleared (430), the current representation is altered accordingly (440) and the statistical accumulators are updated (450). "Altered accordingly" depends on the present bit-set representation and the bit value that it is desired to store. For example, if a bit is set in an "all ZERO" leaf node, the node may be split into two (a smaller "all ZERO" node and a "literal bits" node containing mostly zero bits, plus the newly-set bit). Setting a bit in an "all ONE" leaf node requires no changes; and setting or clearing a bit in a "literal bits" node can be accomplished without changing the structure of the tree or linked list representation.

Periodically, the representation may be optimized (460). For example, if a series of natively-represented bits have all been set to the same value, then the series may be replaced with an "all ZERO" or "all ONE" node. In addition, consecutive leaves that encode the same value may be replaced with a single node representing the combined bits.

If the current representation is sub-optimal (e.g., it occupies more space than another representation would, or its access times are slower than another representation) (470) then the sparse bit set may be automatically re-encoded using a superior structure (480). When the sparse bit set has been completely calculated (i.e., when a subquery has been finished), a final optimization and re-encoding may be performed to "freeze" the bit set before caching it (490). This re-encoding may prefer to optimize the bit set for reduced space or for faster access.

Figure 5:
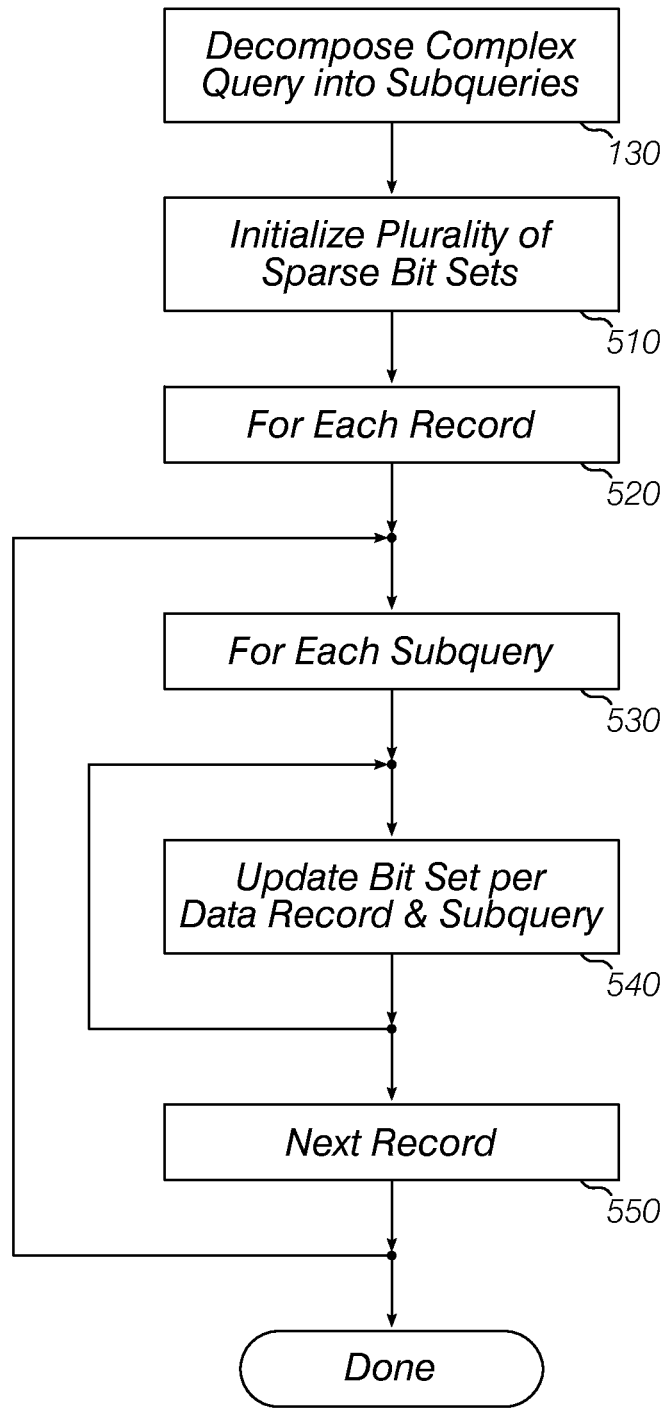
FIG. 5 outlines a method for improving complex query performance with several instances of embodiments of the invention.

Proceeding from this overview of the function and possible implementations of a sparse bit set according to an embodiment of the invention, we turn to techniques to further improve their efficiency. First, it should be noted that a pass through all records of a data set (such as described in connection with FIG. 1) is a computationally expensive undertaking. Datasets may be too large to fit in memory, so a beginning-to-end pass involves reading consecutive portions of the data from secondary storage (such as a hard disk or solid-state drive), processing them, and then moving on to the next portion. FIG. 5 shows how a query processing system can execute a complex query more efficiently than simply re-scanning the data set once for each subquery that must be answered to compute the complex query result.

As in FIG. 1, the complex query is decomposed into a plurality of simple queries (130). Query planning also determines how to combine the simple-query results to yield the desired information. Next, a plurality of sparse bit sets are initialized, each to hold results of one of the subqueries (510). Then a single pass is made through the dataset, and for each record (520), and for each subquery (530), the corresponding sparse bit set is updated to reflect whether the record is "in" or "out" of the result set for the subquery (540), before proceeding to the next record (550).

In other words, instead of one pass through the dataset for each subquery, the plurality of subqueries are executed in parallel during a single pass through the dataset. This allows the cost of loading dataset blocks from secondary storage to be amortized over all of the subqueries, rather than being paid in full for each independent subquery. The trade-off is that the plurality of sparse bit sets must be simultaneously accessible so that results for each subquery can be recorded, but the memory efficiency of the bit sets' representation usually makes this a net positive.

It is appreciated that some complex queries may contain nested subqueries where an inner subquery requires an independent pass through the dataset before an outer subquery can be executed, but by performing as many subqueries as possible during each pass (and by caching and reusing previously-computed subquery results) overall performance can be improved. In fact, a system may be able to amortize the cost of a dataset scan among even more subqueries by aggregating subqueries from multiple complex queries, and even complex queries issued by multiple users.

At any rate, once the multiple sparse bit sets corresponding to the multiple subqueries have been computed, selected ones of them can be joined, intersected, concatenated, inverted and/or counted to produce the result sought by the complex query (550). Bit sets constructed by Boolean operations on another bit set (or another pair of bit sets) are conceptually simple: one merely indexes through the bits and performs the appropriate logical operation (AND, NAND, OR, NOR, XOR, XNOR, NOT) on the input bit(s) to obtain the output bit. However, this operation can be completed more quickly if multi-bit leaves or nodes of the sparse bit set are computed together. For example, a 300-bit "all ONE" leaf can be inverted to produce a 300-bit "all ZERO" result, and a 700-bit "all ONE" leaf logically ANDed with any leaf representing up to the same number of bits, yields the second operand leaf. In other words, logical operations between long blocks of same-valued bits can be optimized according to the following table:

| Input 1 | Input 2 | Operation | Output |
|---------|---------|-----------|--------|
| All 0   | Any     | AND       | All 0 (Input 1) |
| All 1   | Any     | AND       | Any (Input 2) |
| All 0   | Any     | OR        | Any (Input 2) |
| All 1   | Any     | OR        | All 1 (Input 1) |
| All 0   | Any     | XOR       | Any (Input 2) |
| All 1   | Any     | XOR       | ~Any (Input 2 Inverted) |

That is, the result of many binary Boolean operations is simply one or the other of the input operands.

A practical, flexible and efficient implementation of a sparse bit set node might comprise the elements shown in the following listing:

Listing 2

```
10    class SBSNode {
20      union {
30        struct {
40          SBSNode *prev;
50          SBSNode *nxt;
60        };
70        struct {
80          SBSNode *left;
90          SBSNode *right;
100       }
110     }
120     unsigned bit0;
130     unsigned nbits;
140     unsigned skip;
150     bool literal;
160     bool val;
170     unsigned realbits[ ];
180   }
```

The node structure can be incorporated into a linked-list representation using the prev and nxt pointers, or into a binary tree using left and right. The index of the first bit represented by the node is bit0, and nbits is the number of bits the node represents. Skip indicates the number of bits to be ignored at the beginning of the node's literal value (further details below). Literal indicates whether this node contains actually-represented bits, or is an "all-ZERO" or "all-ONE" node. Val distinguishes between the two types of all-the-same-value nodes, while the realbits array is where actually-represented bits are stored in a literal node.

Figure 9:
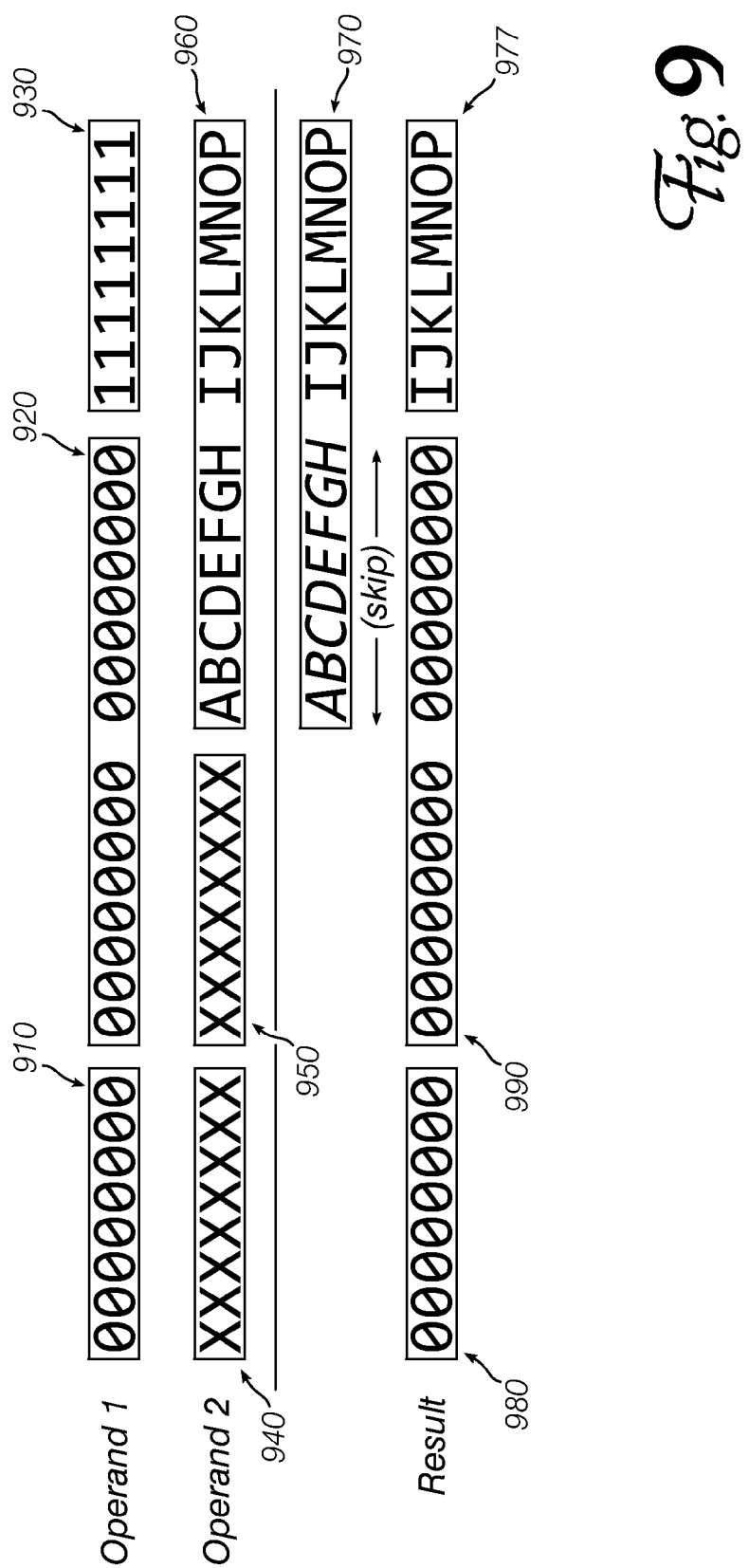
FIG. 9 shows how a preferred embodiment can benefit from maintaining additional information about its structure.

A node may use the skip element if a binary operation between two different sparse bit sets results in a partial masking between a uniform block of same-valued bits and a differently-sized block of actually-represented bits. This is shown in FIG. 9, a sample intersection (logical AND) between two, 32-bit sparse-bit-set operands. The first operand comprises three leaves: eight all-ZERO bits 910, sixteen all-ZERO bits 920, and eight all-ONE bits 930. The second operand comprises two eight-bit leaves 940 and 950 (their values are immaterial, because of the short-cut AND optimization mentioned above), and a sixteen-bit literal bit leaf 960, whose bit values are represented by the letters A-P.

The result of the intersection is also contained in three leaves: eight all-ZERO bits 980, sixteen all-ZERO bits 990, and a copy 970 of literal leaf 960, where the skip value has been set so that the first eight bits (A-H) are ignored. Thus, only the last eight bits (I-P) appear in the result, as shown at 977. Between the bit0, nbits and skip values of a leaf, the generic leaf-node structure of Listing 2 allows leaves to be placed in trees or lists with great flexibility; without these values (or logical equivalents thereof) bits and leaves might often have to be shifted, masked, or otherwise manipulated—time-consuming operations that an embodiment should try to avoid.

Recall that bits in bit sets represent interned data values—integers chosen from a densely-populated range that correspond to the literal values in the dataset. Since interned integers are often assigned in a numeric order that mirrors another order in the data (e.g., an alphabetical or temporal order), an in-order scan through the bit set may yield pre-ordered data values. Therefore, by using data interning and sparse bit sets, a separate sorting operation can often be avoided.

Sparse bit sets according to an embodiment of the invention find application in supporting another data-processing task, as well. Turning to FIG. 6, consider a "dictionary" data structure comprising a plurality of key/value pairs. When a dictionary uses integers chosen from a densely-populated range as keys, a sparse bit set can quickly provide an indication whether any particular integer exists in the dictionary (without requiring a search through the stored keys to find the value). To store new values in a combination dictionary/sparse bit set (FIG. 7), the bit corresponding to the integer key is set in the sparse bit set (710), then the key/value entry is made in the dictionary (720). To retrieve a keyed value (FIG. 8), the bit corresponding to the integer key is located in the sparse bit set (810). If the bit is clear (820), the dictionary does not contain the value, so a default value may be returned (830). If the bit is set (840), then the computationally-expensive dictionary lookup is performed (850) and the corresponding value is returned (860).

An embodiment of the invention may be a machine-readable medium (including without limitation a non-transitory machine-readable medium) having stored thereon data and instructions to cause a programmable processor to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In some embodiments, the instructions for a programmable processor may be treated as data and used to modulate a carrier signal, which can subsequently be sent to a remote receiver, where the signal is demodulated to recover the instructions, and the instructions are executed to implement the methods of an embodiment at the remote receiver. In the vernacular, such modulation and transmission are known as "serving" the instructions, while receiving and demodulating are often called "downloading." In other words, one embodiment "serves" (i.e., encodes and sends) the instructions of an embodiment to a client, often over a distributed data network like the Internet. The instructions thus transmitted can be saved on a hard disk or other data storage device at the receiver to create another embodiment of the invention, meeting the description of a machine-readable medium storing data and instructions to perform some of the operations discussed above. Compiling (if necessary) and executing such an embodiment at the receiver may result in the receiver performing operations according to a third embodiment.

In the preceding description, numerous details were set forth. It will be apparent, however, to one skilled in the art, that the present invention may be practiced without some of these specific details. In some instances, well-known structures and devices are shown in block diagram form, rather than in detail, in order to avoid obscuring the present invention.

Some portions of the detailed descriptions may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, including without limitation any type of disk including floppy disks, optical disks, compact disc read-only memory ("CD-ROM"), and magnetic-optical disks, read-only memories (ROMs), random access memories (RAMs), eraseable, programmable read-only memories ("EPROMs"), electrically-eraseable read-only memories ("EEPROMs"), magnetic or optical cards, or any type of media suitable for storing computer instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will be recited in the claims below. In addition, the present invention is not described with reference to any particular programming language. It will be appreciated that a variety of programming languages may be used to implement the teachings of the invention as described herein.

The applications of the present invention have been described largely by reference to specific examples and in terms of particular allocations of functionality to certain hardware and/or software components. However, those of skill in the art will recognize that larger data sets and faster query processing can also be accomplished by software and hardware that distribute the functions of embodiments of this invention differently than herein described. Such variations and implementations are understood to be captured according to the following claims.

We claim:

1. A method of performing space-efficient data query operations, comprising:
    interning fields of a plurality of multi-field records to produce interned records representing the multi-field records;
    receiving a query to compute a result over the plurality of multi-field records;
    initializing a sparse bit set, said sparse bit set sized to accommodate a number of distinct values present in one of the fields of the plurality of multi-field records;
    dividing the interned records into two classes according to the query; and
    setting a bit in the sparse bit set for each interned record of one of the two classes, wherein
    an in-memory representation of the sparse bit set, exclusive of overhead, occupies fewer bits than the number of distinct values present in the one of the fields of the plurality of multi-field records.

2. The method of claim 1 wherein the in-memory representation of the sparse bit set comprises a plurality of blocks, all but one of which represent a number of bits that is a power-of-two multiple of a natural word size, and each such block containing exactly one of:
    all clear bits; or
    all set bits; or
    a subordinate plurality of blocks of recursive structure, all of such blocks having a power-of-two size; or
    the power-of-two multiple number of bits, each bit thereof in either a clear state or a set state.

3. The method of claim 1 wherein the sparse bit set is a first sparse bit set, the method further comprising:
    repeating the receiving, initializing, dividing and setting operations to produce a second sparse bit set; and
    creating a third sparse bit set as a two-operand function of the first sparse bit set and the second sparse bit set.

4. The method of claim 3 wherein the two-operand function is one of a union, an intersection, or an exclusive or of the first sparse bit set and the second sparse bit set.

5. The method of claim 1, further comprising:
    determining a number of clear bits in the sparse bit set.

6. The method of claim 1, further comprising:
    determining a number of set bits in the sparse bit set.

7. A method for improving access speed for a key-value dictionary, comprising:
    initializing a sparse bit set and a key-value dictionary;
    receiving an integer-valued key and a corresponding value;
    setting a bit in the sparse bit set corresponding to the integer-valued key;
    inserting a key-value binding into the key-value dictionary, a key of said key-value binding equal to the integer-valued key, and a value of the key-value binding equal to the corresponding value;
repeating the receiving, setting and inserting operations;
receiving an integer-valued search key;
examining a bit in the sparse bit set corresponding to the integer-valued search key;
if the bit in the sparse bit set corresponding to the integer-valued search key is clear, returning a default value; and
if the bit in the sparse bit set corresponding to the integer-valued search key is set, searching the key-value dictionary for the integer-valued search key and returning a value from a key-value binding corresponding to the integer-valued search key.

8. The method of claim 7 wherein the default value indicates that the key-value dictionary does not contain a value corresponding to the integer-valued search key.

9. The method of claim 7 wherein the integer-valued key is an integer from a densely-utilized range of integers.

10. The method of claim 9, further comprising:
receiving a non-integer-valued key;
converting the non-integer-valued key to a corresponding integer drawn from a densely-utilized range of integers; and
using the corresponding integer as the integer-valued key.

11. A non-transitory computer-readable medium containing instructions and data to cause a programmable processor to perform operations comprising:
initializing a sparse bit set structure to accommodate a predetermined number of bits with a predetermined initial value, said sparse bit set structure occupying fewer bits in a memory of the programmable processor than the predetermined number of bits;
modifying the sparse bit set structure to represent one bit with a complement of the predetermined initial value, a remainder of said predetermined number of bits retaining their previous values, said modification yielding a modified sparse bit set structure that occupies fewer bits in the memory of the programmable processor than the predetermined number of bits;
accessing the modified sparse bit structure to retrieve a current value of an identified one of the predetermined number of bits; and
returning the current value of the identified one of the predetermined number of bits.

12. The non-transitory computer-readable medium of claim 11, containing additional data and instructions to cause the programmable processor to perform operations comprising:
concatenating the sparse bit set structure with a second sparse bit set structure to produce a third sparse bit set structure representing a number of bits no smaller than a sum of the predetermined number of bits and a second predetermined number of bits represented by the second sparse bit set structure, said third sparse bit set structure occupying fewer bits in the memory of the programmable processor than the sum of the predetermined number of bits and the second predetermined number of bits.

13. The non-transitory computer-readable medium of claim 11, containing additional data and instructions to cause the programmable processor to perform operations comprising:
computing a Boolean operation between the sparse bit set structure and a second sparse bit set structure to produce a third sparse bit set structure representing a number of bits no smaller than a greater of the predetermined number of bits and a second predetermined number of bits represented by the second sparse bit set structure, said third sparse bit set structure occupying fewer bits in the memory of the programmable processor than the sum of the predetermined number of bits and the second predetermined number of bits.

14. The non-transitory computer-readable medium of claim 13 wherein the Boolean operation is one of AND, NAND, OR, NOR, XOR or XNOR.

15. The non-transitory computer-readable medium of claim 11, containing additional data and instructions to cause the programmable processor to perform operations comprising:
computing a unary operation on the sparse bit set structure to produce a second sparse bit set structure representing at least the predetermined number of bits, said second sparse bit set structure occupying fewer bits in the memory of the programmable processor than the predetermined number of bits.

16. The non-transitory computer-readable medium of claim 11 wherein the sparse bit set structure comprises at least one leaf node, and wherein each of the at least one leaf node represents one of:
a plurality of clear ("ZERO") bits;
a plurality of set ("ONE") bits; or
a plurality of literal bits.

17. The non-transitory computer-readable medium of claim 16 wherein modifying the sparse bit set structure comprises:
splitting the at least one node into a plurality of child nodes, said plurality of child nodes representing a number of bits equal to a number of bits represented by the at least one node; and wherein
the plurality of child nodes represent a substantially identical plurality of bits as the at least one node, except that the plurality of child nodes represent a single changed bit value from the plurality of bits of the at least one node.

18. The non-transitory computer-readable medium of claim 11, containing additional data and instructions to cause the programmable processor to perform operations comprising:
optimizing the sparse bit structure to represent an identical predetermined number of bit values while occupying fewer bits in the memory than the lesser of the predetermined number of bits and a number of bits in the memory occupied by the sparse bit structure prior to the optimizing operation.

* * * * *